Patented Jan. 6, 1942

2,268,556

UNITED STATES PATENT OFFICE 2,268,556

FIRE RETARDANT TEXTILE

Roger Adams, Champaign, Ill., and Charles William Joseph Wende, Wilmington, Del., assignors to E. I. du Pont de Nemours & Company, Wilmington, Del., a corporation of Delaware No Drawing. Application January 6, 1939, Serial No. 249,654

20 Claims. (Cl. 91—68)

This invention relates to the flame-proofing of combustible non-volatile organic materials.

The fire-proofing of combustible materials such as textiles with ammonium phosphate is known. This compound suffers, however, from the disadvantage that it is not readily fixed in the material in such a way as to resist water, e. g., in washing. Organic phosphates have also been employed as fire-retardants, but they ordinarily must be used in amounts at least as large as 30% by weight of the material, and sometimes as much as 50%.

This invention has as an object the provision of a new, effective fire-retarding and afterglow-proofing agent for combustible, non-volatile organic materials. A further object is the provision of a fire-retarding agent which may readily be affixed to the combustible material so as to render the fire-proofing resistant to laundering.

These objects are accomplished by the following invention wherein a compound containing a phytyl radical attached to a cation in which, when organic, the C:N ratio does not exceed 2:1 (i. e., phytic acid and most of its salts) is incorporated, by the methods and in the amounts set forth more fully below, with non-volatile, organic, combustible materials, especially cellulosic materials such as paper, textiles, and regenerated cellulose thread or film. By the phytyl radical is meant a radical obtained by subtracting one or more acid hydrogens from phytic acid, the compound of the formula $C_6H_6(PO_4H_2)_6$, which is also known as inositol hexaphosphate.

Phytic acid, any of its metallic salts, and any of its addition salts with organic bases of C:N ratio not exceeding 2:1 (or comprehensively any compound $(Ph)_x(A)_y$ where Ph is a phytyl radical; A is a cation having not more than two carbons for each nitrogen that it may contain; $x$ is the valence of A; and $y$ is the valence of Ph) are all effective fire-retardants when incorporated in non-volatile, combustible, organic materials. They may be incorporated with the combustible material in various ways. In the case of textile materials such as cotton, wool, silk, linen, rayon, etc., a satisfactory method is merely to immerse the textile in an aqueous solution of the phytate, wring out the textile, and dry it. The material thus treated has a decreased tendency to ignite and burn and a reduced rate of burning, and in many cases will not propagate a flame under conditions which result in the complete combustion of the untreated material.

In certain of the preferred modes of the process of the present invention an aqueous solution of a suitable phytate is used. These may be made as follows:

EXAMPLE A

*Ammonium phytate*

Ten (10) parts of crude calcium phytate is dissolved in five parts of concentrated hydrochloric acid and five parts of water, and 6N sulfuric acid is slowly added as long as a precipitate forms. The precipitate is filtered off and discarded. The filtrate is neutralized with a slurry of cupric hydroxide, and the precipitate of copper phytate is filtered off and washed until the wash water is free of sulfate. The copper phytate is then suspended in 200 parts of water and decomposed by passing hydrogen sulfide through the suspension. The copper sulfide is filtered off and the filtrate is evaporated on the steam bath to a syrupy mass of phytic acid. A solution of the ammonium salt is obtained by neutralizing the acid with ammonium hydroxide.

EXAMPLE B

*Calcium acid phytate*

Three hundred (300) parts of crude calcium phytate is dissolved in 900 parts of concentrated hydrochloric acid, filtered, and precipitated by the addition to the filtrate of four volumes of ethanol. Fifteen (15) parts of the dried precipitate is brought to a boil in a solution of 12 parts of oxalic acid in 150 parts of water and allowed to stand overnight. The precipitate of calcium oxalate is filtered off, and the filtrate is evaporated to dryness on the steam bath under a current of air. The product is a brownish mass of water-soluble calcium acid phytate which can be decolorized by treatment with active charcoal.

The more detailed practice of the invention is illustrated by the following examples, wherein parts given are by weight. There are of course many forms of the invention other than these specific embodiments.

EXAMPLE I

Five (5) parts of phytic acid is dissolved in 20 parts of water and made neutral to litmus with 6N ammonium hydroxide. Cotton broadcloth, soaked in this solution of ammonium phytate, thoroughly wrung out, and dried, propagates a flame neither horizontally nor vertically, and shows no afterglow.

EXAMPLE II

A 30% aqueous solution of calcium acid phytate is neutralized with 6N ammonium hydroxide.

Cotton broadcloth is soaked in the solution, wrung out, and dried. The cloth retains 24% of its weight of the calcium ammonium phytate, and propagates a flame neither horizontally or vertically. Substantially the same results are obtained with a more dilute solution which deposits 14.5% of salt on the cloth. At 9.0% and 5.4%, the cloth is rendered fire-retardant rather than flame-proof, i. e., the flame is slowly propagated vertically, though not horizontally. In no case is an afterglow present and in all cases the treated cloth is definitely more resistant to fire than the untreated cloth.

EXAMPLE III

Cotton cloth is impregnated with a 15% aqueous solution of polyethylenimine prepared according to the disclosure of copending application of Wallace Emerson Gordon, Serial No. 249,653, filed of even date herewith. The sample is wrung out, dried, and baked at 100–110° C. for four hours. It is then soaked in a 15% aqueous solution of water-soluble calcium acid phytate, wrung out, thoroughly rinsed, and dried. It neither propagates a flame nor shows an afterglow when exposed to the Bunsen flame, and retains these properties after half-hour treatments in water at 50° C. and at 100° C., respectively. The sample withstands the action at 100° C. of a 1% solution of a strong wetting agent (sulfated long chain alcohols) and when dry is soft and pliable, with no stiffness or harshness.

The above is an exemplification of the present invention in the use of a phytate, and is also, in the use of the ethylenimine, an exemplification of the invention of the above identified Gordon application.

EXAMPLE IV

Cotton cloth is treated as in Example III, except that a 15% aqueous solution of phytic acid is used in place of the calcium acid phytate. The product is similar in all respects to that described in Example III.

EXAMPLE V

Cotton cloth is treated as in Example III, except that a 15% aqueous solution of phytic acid is used instead of the calcium acid phytate and the drying operation is followed by a dip in a 10% solution of calcium chloride and a rinse in warm water. The product is similar to that obtained in Example III.

EXAMPLE VI

Twenty (20) parts of a 30% aqueous solution of calcium acid phytate is neutralized with ethylenediamine, and the solution is diluted with water to a total of 40 parts. Rayon fabric is soaked in this solution for five minutes, thoroughly wrung out, and dried. The cloth propagates a flame neither horizontally nor vertically and shows no afterflow. The impregnated salt shows no tendency to dust out of the fabric.

EXAMPLE VII

Gel regenerated cellulose in sheet form is immersed for five minutes in a solution of ethylenediamine phytate prepared as in Example VI. The sheet is drained, stretched on a frame, and dried at room temperature. The product propagates a flame neither vertically nor horizontally, and shows no afterglow. The salt shows no tendency to crystallize in the film even after heating overnight at 110° C., and exerts a definite softening action on the regenerated cellulose sheet.

Calcium ammonium phytate is likewise a fire-retardant for gel regenerated cellulose in sheet or thread form, though it is not so advantageous in other respects as the ethylenediamine phytate of the above two examples.

As previously indicated, any compound having a phytyl radical attached to a cation in which, when organic, the C:N ratio does not exceed 2:1 will have a fire-retarding effect on combustible non-volatile organic materials. Suitable compounds in addition to phytic acid and the phytates of the examples include the addition salts of phytic acid with one or more basic nitrogenous compounds such as methylamine, ethylamine, ethanolamine, dimethylamine, diethylenetriamine, triethylenetetramine, tetraethylenepentamine, guanidine, aminoguanidine, and dicyandiamidine. Salts in which all or a part of the acid hydrogens are replaced by such metallic cations as sodium, potassium, calcium, barium, magnesium, zinc, titanyl, lead, cobalt, cadmium, iron, aluminum, tin, copper, nickel, bismuth, manganese, or combinations of these are suitable. Amine or metallic phytates prepared from corn steep water may be used. Best results are generally obtained, however, with mixed phytates of one or more of the above-mentioned nitrogen bases and metals. One of the reasons for this is that, unlike many of the simple metal salts, the mixed amine metal salts have little tendency to "crock" or dust off of textiles while at the same time having a satisfactory degree of fire-retardance. Another reason is that textiles which contain the mixed salts are often more resistant to laundering operations than are textiles containing the simple amine salts.

In regard to the relative degree of fire-retardance, phytic acid itself is perhaps most effective, but, because of its high water solubility and acidity, would not be used by choice unless these properties were unobjectionable. Ammonium phytate is probably next in effectiveness and would be employed when high acidity is objectionable and water-proofness unimportant. The phytates of light metals and the phytates of organic bases in which the C:N ratio is 1:1 or less are somewhat less effective, while the phytates of heavy metals and the phytates of organic bases in which the C:N ratio is greater than 1:1 are least effective. Due to the combustible carbon and hydrogen in amines, the amine phytates become less and less effective as the C:N ratio in the amine increases, and, when this ratio exceeds 2:1, the fire-retardance disappears or becomes so small as to be of little or no significance. Thus, phytates of such amines as methylamine and ethylenediamine are suitable while phytates of amines such as propylamine, pyridine, and aniline are not.

Phytates of the above-mentioned types may advantageously be used in combination with other known fire-retardants such as borates, phosphates or sulfamates.

Various methods may be used for applying the metallic phytate to the combustible body. One such method is merely to prepare a soluble metallic phytate such as a calcium acid phytate or a soluble calcium ammonium phytate, impregnate the cloth, for example, with an aqueous solution of the compound, and dry. An alternative procedure is to prepare water-insoluble phytates of metals (such as zinc, copper, or cadmium) which are capable of forming soluble complexes with ammonium hydroxide or amines, the cloth then being impregnated with these solutions and baked to decompose the complex and precipitate the insoluble phytate.

When the cloth is pretreated with ethylenimine or polyethylenimine, a solution of phytic acid or of a partial metallic phytate may be used. In this case the cloth may be rinsed in water to remove the excess phytate. The acid and its acid salts become strongly attached to fabrics which contain polyethylenimine. Alternatively, as shown in Example V, the cloth containing polyethylenimine may be treated in a solution of phytic acid and then subjected to a second dip in a solution which contains the desired metallic cation. The product thus obtained is exceptionally resistant to laundering.

The concentration of phytyl compound that is necessary depends on the nature of the cation and the degree of flame-proofness desired. Ammonium phytate completely inhibits the propagation of flame when it is present to the extent of approximately 15% or more of the weight of the fabric, but concentrations as low as 5% have a definite effect in slowing down combustion. In the case of amine and mixed amine-and-metal salts, it may be necessary to use from 20% to 50% of the phytate salt to make the cloth completely non-flammable, however, definite fire-retarding effects are again obtained with lower concentrations.

The concentration of the solution from which a given salt is impregnated into the average cotton textile is in general roughly equal to the concentration of salt which is to be left on the cloth, since a cloth which is impregnated and thoroughly wrung out usually takes up approximately its own weight of solution.

The fire retardants of the present invention are of use in retarding the burning of any combustible, non-volatile organic material. While they are of particular value in connection with cellulosic materials such as cotton textiles, linen, rayon, paper, crepe paper, jute, hemp, kapok, or wood, and particularly with such textiles as broadcloth, muslin, duck, upholstery fabrics, etc., they may also be used to advantage with any substantially non-volatile organic combustible material whatever. Among such additional materials are proteins and their manufactures, such as casein, zein, gelatin, edestin, gliadin, and fibers and filaments therefrom. Natural and synthetic resins such as rosin, ester gum, vinyl resins, alkyd resins, ether resins, polymeric esters of acrylic and methacrylic acids, and films and plastics therefrom, cellulose derivatives such as cellulose nitrate, cellulose acetate, ethyl cellulose, benzyl cellulose and urea cellulose; natural and synthetic oils and films therefrom such as linoxyn, divinylacetylene polymer, and China-wood oil, rubber and synthetic rubbers; leather, silk, and wool; and any other similar combustible material.

The present phytyl compounds are effective flame-proofing agents. A great advantage of phytic acid lies in the fact that it contains twelve ionizable hydrogen atoms, so that a portion of these may be replaced by insolubilizing metal ions while those remaining may be used to attach the molecule to cellulosic textiles, e. g., by means of such organic bases as ethylenimine which have an especial affinity for cellulose. This type of system is unusually stable to the attack of water and detergents.

The above description and examples are intended to be illustrative only. Any modification of or variation therefrom which conforms to the spirit of the invention is intended to be included within the scope of the claims.

We claim:

1. A non-volatile combustible organic material and, in added amount sufficient to act as a fire-retardant therefor, a compound containing the phytyl radical attached to a cation of the class consisting of inorganic cations and nitrogen-containing organic cations having a carbon to nitrogen ratio not exceeding 2:1.

2. A cellulosic material and, in added amount sufficient to act as a fire-retardant therefor, a compound containing the phytyl radical attached to a cation of the class consisting of inorganic cations and nitrogen-containing organic cations having a carbon to nitrogen ratio not exceeding 2:1.

3. A fibrous cellulosic material and, in added amount sufficient to act as a fire-retardant therefor, a compound containing the phytyl radical attached to a cation of the class consisting of inorganic cations and nitrogen-containing organic cations having a carbon to nitrogen ratio not exceeding 2:1.

4. A non-fibrous cellulosic material and, in added amount sufficient to act as a fire-retardant therefor, a compound containing the phytyl radical attached to a cation of the class consisting of inorganic cations and nitrogen-containing organic cations having a carbon to nitrogen ratio not exceeding 2:1.

5. A cotton textile and, in added amount sufficient to act as a fire-retardant therefor, a compound having the phytyl radical attached to a cation of the class consisting of inorganic cations and nitrogen-containing organic cations having a carbon to nitrogen ratio not exceeding 2:1.

6. Sheet regenerated cellulose and, in added amount sufficient to act as a fire-retardant therefor, a compound containing the phytyl radical attached to a cation of the class consisting of inorganic cations and nitrogen-containing organic cations having a carbon to nitrogen ratio not exceeding 2:1.

7. A cotton textile and, in added amount sufficient to act as a fire-retardant therefor, phytic acid affixed to said textile by means of ethylenimine.

8. A cotton textile and, in added amount sufficient to act as a fire-retardant therefor, calcium acid phytate affixed to said textile by means of polyethylenimine.

9. Sheet regenerated cellulose and, in added amount sufficient to act as a fire-retardant therefor, ethylenediamine phytate.

10. A fire retardant product comprising a non-volatile combustible material and at least 5% by weight thereof of a compound containing the phytyl radical attached to a cation of the class consisting of inorganic cations and nitrogen-containing organic cations having a carbon to nitrogen ratio not exceeding 2:1.

11. A fire retardant cellulosic material containing at least 5% of the weight thereof of a compound containing the phytyl radical attached to a cation of the class consisting of inorganic cations and nitrogen-containing organic cations having a carbon to nitrogen ratio not exceeding 2:1.

12. A fire retardant fibrous cellulosic material containing at least 5% of the weight thereof of a compound containing the phytyl radical attached to a cation of the class consisting of inorganic cations and nitrogen-containing organic cations having a carbon to nitrogen ratio not exceeding 2:1.

13. A fire retardant non-fibrous cellulosic material containing at least 5% of the weight thereof of a compound containing the phytyl radical attached to a cation of the class consisting of inorganic cations and nitrogen-containing organic cations having a carbon to nitrogen ratio not exceeding 2:1.

14. A fire retardant cotton textile containing at least 5% of the weight thereof of a compound containing the phytyl radical attached to a cation of the class consisting of inorganic cations and nitrogen-containing organic cations having a carbon to nitrogen ratio not exceeding 2:1.

15. A fire retardant sheet regenerated cellulose containing at least 5% by weight thereof of a compound containing the phytyl radical attached to a cation of the class consisting of inorganic cations and nitrogen-containing organic cations having a carbon to nitrogen ratio not exceeding 2:1.

16. A fire retardant cotton textile containing at least 5% of the weight thereof of phytic acid affixed to said cloth by means of ethylenimine.

17. A fire retardant cotton textile containing at least 5% of the weight thereof of calcium acid phytate affixed to said cloth by means of polyethylenimine.

18. A fire retardant sheet regenerated cellulose containing at least 5% by weight of ethylenediamine phytate.

19. A fire retardant rayon fabric containing at least 5% of the weight thereof of a compound containing the phytyl radical attached to a cation of the class consisting of inorganic cations and nitrogen-containing organic cations having a carbon to nitrogen ratio not exceeding 2:1.

20. A fire retardant rayon fabric containing at least 5% of the weight thereof of phytic acid affixed to said cloth by means of ethylenimine.

ROGER ADAMS.
CHARLES WILLIAM JOSEPH WENDE.